US012609346B2

(12) United States Patent
Yoon et al.

(10) Patent No.: US 12,609,346 B2
(45) Date of Patent: Apr. 21, 2026

(54) ANODE FOR LITHIUM SECONDARY BATTERY AND MANUFACTURING METHOD THEREFOR

(71) Applicant: LG Energy Solution, Ltd., Seoul (KR)

(72) Inventors: Jong Su Yoon, Daejeon (KR); Taek Soo Lee, Daejeon (KR); Jin Ho Cho, Daejeon (KR); Shin Wook Jeon, Daejeon (KR); Young Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/853,257

(22) PCT Filed: Nov. 27, 2023

(86) PCT No.: PCT/KR2023/019195
§ 371 (c)(1),
(2) Date: Oct. 1, 2024

(87) PCT Pub. No.: WO2024/136186
PCT Pub. Date: Jun. 27, 2024

(65) Prior Publication Data
US 2025/0112263 A1 Apr. 3, 2025

(30) Foreign Application Priority Data

Dec. 23, 2022 (KR) ........................ 10-2022-0183016
Feb. 9, 2023 (KR) ........................ 10-2023-0017427

(51) Int. Cl.
*H01M 4/02* (2006.01)
*H01M 4/04* (2006.01)
(Continued)

(52) U.S. Cl.
CPC ..... *H01M 10/0525* (2013.01); *H01M 4/0404* (2013.01); *H01M 4/366* (2013.01); *H01M 4/583* (2013.01); *H01M 2004/027* (2013.01)

(58) Field of Classification Search
None
See application file for complete search history.

(56) References Cited

U.S. PATENT DOCUMENTS

2006/0078796 A1    4/2006  Ozaki et al.
2010/0297501 A1*  11/2010  Seki ...................... H01M 4/623
                                                      429/231.8
(Continued)

FOREIGN PATENT DOCUMENTS

CN        110931734 A       3/2020
EP          3872904 A1      9/2021
(Continued)

OTHER PUBLICATIONS

International Search Report for PCT/KR2023/019195 mailed Mar. 4, 2024. 3 pages.
(Continued)

*Primary Examiner* — Zhongqing Wei
(74) *Attorney, Agent, or Firm* — Lerner David LLP

(57) ABSTRACT

A negative electrode for a lithium secondary battery includes a negative electrode active layer divided into a center region, an edge region, and a sliding region on a negative electrode current collector. The lithium precipitation at the end of the negative electrode active layer can be suppressed by the alignment (O.I) of each carbon-based negative electrode active material contained in the center region, the edge region, and the sliding region satisfying Equation 1 and Equation 2. A secondary battery including the same has the
(Continued)

100 advantage of excellent rapid charging performance. A method of manufacturing the negative electrode is also provided.

4 Claims, 3 Drawing Sheets

(51) Int. Cl.
H01M 4/36       (2006.01)
H01M 4/583      (2010.01)
H01M 10/0525    (2010.01)

(56)                References Cited

U.S. PATENT DOCUMENTS

| | | | |
|---|---|---|---|
| 2018/0151867 A1* | 5/2018 | Lim .................... | H01M 4/0435 |
| 2019/0305293 A1* | 10/2019 | Sotowa ............. | H01M 10/0562 |
| 2021/0167398 A1 | 6/2021 | Choi et al. | |
| 2021/0336244 A1 | 10/2021 | Kang et al. | |
| 2022/0140343 A1 | 5/2022 | Park et al. | |
| 2022/0263063 A1 | 8/2022 | Lee et al. | |
| 2022/0352543 A1 | 11/2022 | Cheong et al. | |

FOREIGN PATENT DOCUMENTS

| | | | | |
|---|---|---|---|---|
| JP | 2001015146 | A | | 1/2001 |
| JP | 2002124249 | A | | 4/2002 |
| JP | 2010262773 | A | * | 11/2010 |
| JP | 2013069431 | A | | 4/2013 |
| JP | 2013069432 | A | | 4/2013 |
| JP | 2013239358 | A | | 11/2013 |
| JP | 2014086258 | A | | 5/2014 |
| JP | 2018129212 | A | | 8/2018 |
| JP | 2019185943 | A | | 10/2019 |
| JP | 2022074139 | A | | 5/2022 |
| JP | 2022530081 | A | | 6/2022 |
| JP | 2022167890 | A | | 11/2022 |
| KR | 20170043240 | A | | 4/2017 |
| KR | 20180060778 | A | | 6/2018 |
| KR | 101972235 | B1 | | 8/2019 |
| KR | 20200019005 | A | | 2/2020 |
| KR | 102183796 | B1 | | 11/2020 |
| KR | 20220064389 | A | | 5/2022 |
| KR | 20220099681 | A | | 7/2022 |

OTHER PUBLICATIONS

Extended European Search Report including Written Opinion for Application No. 23907472.7 dated Jun. 20, 2025, pp. 1-9.

* cited by examiner

[FIG. 1]
<u>100</u>
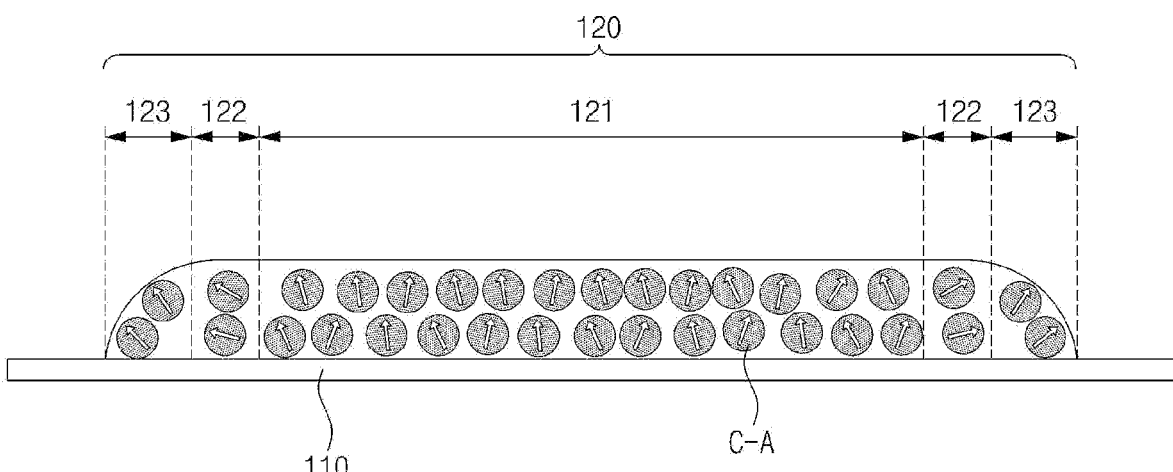

[FIG. 2]
200
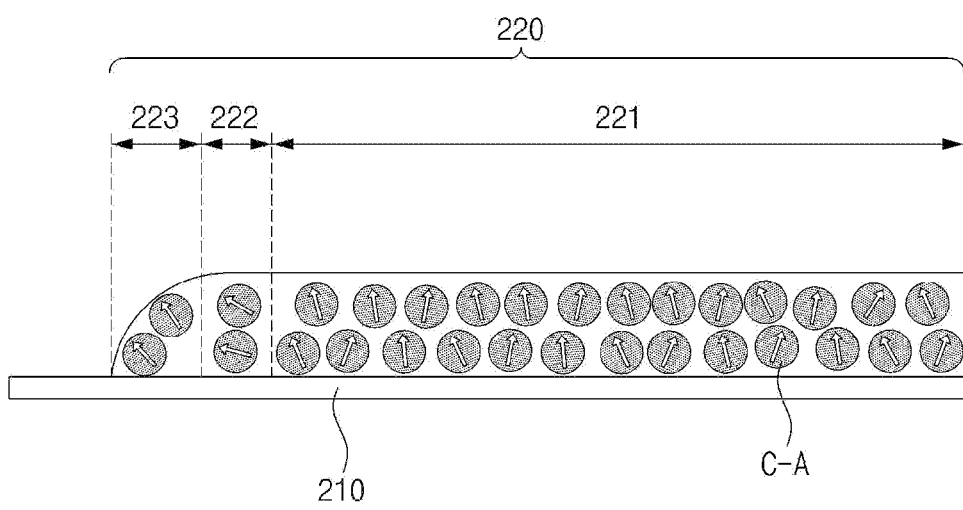

[FIG. 3]
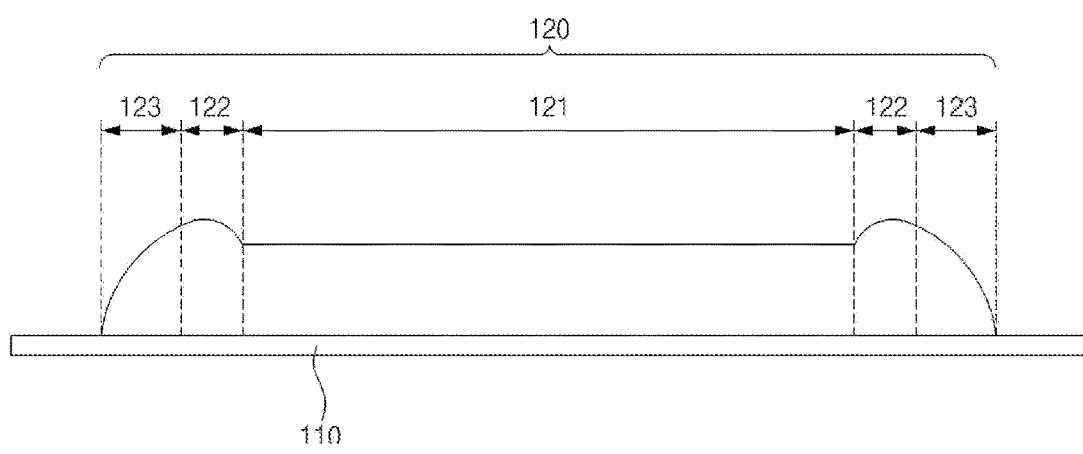

1

ANODE FOR LITHIUM SECONDARY BATTERY AND MANUFACTURING METHOD THEREFOR

CROSS-REFERENCE TO RELATED APPLICATIONS

The present application is a national phase entry under 35 U.S.C. § 371 of International Application No. PCT/KR2023/019195 filed Nov. 27, 2023, which claims priority to Korean Patent Application No. 10-2022-0183016, filed on Dec. 23, 2022, and Korean Patent Application No. 10-2023-0017427, filed on Feb. 9, 2023, the disclosures of which are incorporated herein by reference in their entirety.

TECHNICAL FIELD

The present disclosure relates to a negative electrode for a lithium secondary battery and a manufacturing method thereof.

BACKGROUND

In recent years, secondary batteries have been widely applied in small devices such as portable electronics, as well as in medium and large devices such as battery packs or power storage in hybrid or electric vehicles.

These secondary batteries are chargeable/dischargeable power generators consisting of a laminated structure of a positive electrode/separator/negative electrode, where the positive electrode generally contains lithium metal oxide as a positive electrode active material, and the negative electrode contains a carbon-based active material such as graphite, so that lithium ions emitted from the positive electrode are adsorbed into the carbon-based active material of the negative electrode during charging, and lithium ions contained in the carbon-based active material are adsorbed into the lithium metal oxide of the positive electrode during discharging, and the charge and discharge are repeated.

Meanwhile, one of the factors that determines the performance of a secondary battery is the capacity ratio of the active materials contained in the positive electrode and negative electrode, respectively. This capacity ratio can be expressed as the N/P ratio, which is the total capacity of the negative electrode, obtained by considering the capacity per area and/or weight of the negative electrode, divided by the total capacity of the positive electrode, obtained by considering the capacity per area and/or weight of the positive electrode, and is generally controlled to have a value of 1 or higher, as it has a significant impact on the safety and capacity of the battery.

However, during the manufacturing process of lithium secondary batteries, a reversal phenomenon occurs in which the N/P ratio becomes smaller than 1 when the positive electrode active layer leaves the negative electrode active layer during the lamination of the positive electrode and negative electrode. In this case, when the N/P ratio becomes smaller than 1, the lithium ions cannot intercalate into the negative electrode active material during charging of the battery and precipitate on the surface of the negative electrode to form a dendrite. This dendrite is especially likely to occur when lithium secondary batteries are used for long periods of time under high rate conditions. These dendrites can cause internal short circuits in the battery and thus compromise the safety of the battery.

To solve this problem, conventional attempts have been made to increase the negative electrode active material loading amount at the end of the negative electrode active layer. However, this has the limitation that as the loading amount of negative electrode active material increases, the travel distance of lithium ions in the negative electrode increases, which can lead to a decrease in the rapid charging characteristics, and the like, thereby degrading commercial viability of the battery.

Therefore, there is a high need for a technology that can maintain or improve the rapid charging characteristics beyond a certain level even when the negative electrode active material loading amount at the end of the negative electrode active layer is increased to suppress lithium precipitation at the end of the negative electrode active layer.

Technical Problem

An object of the present disclosure is to provide a negative electrode for a lithium secondary battery having a high negative electrode active material loading amount at the end of the negative electrode active layer and excellent rapid charging performance, and a manufacturing method thereof, in order to suppress lithium precipitation at the end of the negative electrode active layer.

Technical Solution

To resolve the problems described above, in an exemplary embodiment, the present disclosure provides a negative electrode for lithium secondary battery including:

a negative electrode current collector; and a negative electrode active layer provided on at least one side of the negative electrode current collector and including a carbon-based negative electrode active material, wherein the negative electrode active layer is divided into:

a center region including a center part in the width direction of the negative electrode active layer, a sliding region located at the edge of the negative electrode active layer and having a thickness gradient, and an edge region located between the center region and the sliding region; and satisfies Equation 1 and Equation 2 below:

$$2.7 \leq [O.I_{edge}]/[O.I_{center}] \leq 4.8 \qquad \text{[Equation 1]}$$

$$1.5 \leq [O.I_{sliding}]/[O.I_{center}] \leq 2.6 \qquad \text{[Equation 2]}$$

in Equation 1 and Equation 2, $O.I_{edge}$ represents an alignment (O.I) at the edge region, $O.I_{center}$ represents an alignment (O.I) in the center region, $O.I_{sliding}$ represents an alignment (O.I) in the sliding region, and the alignment (O.I) represents the ratio $(I_{004}/I_{110})$ of the area of the peak representing the (0,0,4) crystal face $(I_{004})$ to the area of the peak representing the (1,1,0) crystal face $(I_{110})$ in the XRD measurement for the negative electrode active layer.

Here, the center region of the negative electrode active layer may have an alignment $(O.I_{center})$ of 0.7 to 1.5.

In addition, the center region of the negative electrode active layer may have a ratio of at least 90% of a total length in the width direction of the negative electrode active layer, and the sliding area of the negative electrode active layer may have a ratio of 3% or less of the total length in the width direction of the negative electrode active layer.

Moreover, the center region of the negative electrode active layer has an average thickness of 100 μm to 300 μm, and the exposed surface of the sliding region of the negative electrode active layer may have an inclination angle of 70° or more with respect to the negative electrode current collector.

Meanwhile, the carbon-based active material may include at least one of natural graphite or synthetic graphite.

Furthermore, in an exemplary embodiment, the present disclosure provides a manufacturing method of a negative electrode for lithium secondary battery including:

applying a negative electrode slurry including a carbon-based active material on the negative electrode current collector;

applying a magnetic field to the applied negative electrode slurry; and drying a negative electrode slurry applied with a magnetic field to form a negative electrode active layer, wherein the negative electrode active layer is divided into: a center region including a center part in the width direction of the negative electrode active layer, a sliding region located at the edge of the negative electrode active layer and having a thickness gradient, and an edge region located between the center region and the sliding region; and satisfies Equation 1 and Equation 2 below:

$$2.7 \leq [O.I_{edge}]/[O.I_{center}] \leq 4.8 \qquad \text{[Equation 1]}$$

$$1.5 \leq [O.I_{sliding}]/[O.I_{center}] \leq 2.6 \qquad \text{[Equation 2]}$$

in Equation 1 and Equation 2, $O.I_{edge}$ represents an alignment (O.I) at the edge region, $O.I_{center}$ represents an alignment (O.I) in the center region, $O.I_{sliding}$ represents an alignment (O.I) in the sliding region, and the alignment (O.I) represents the ratio ($I_{004}/I_{110}$) of the area of the peak representing the [0,0,4] crystal face ($I_{004}$) to the area of the peak representing the [1,1,0] crystal face ($I110$) in the XRD measurement for the negative electrode active layer.

Here, in the step of applying the negative electrode slurry, the applied negative electrode slurry may satisfy the following Equation 3:

$$R_{sling} < R_{center} < R_{edge} \qquad \text{[Equation 3]}$$

in Equation 3, $R_{sling}$ represents an average thickness of the sliding region, $R_{edge}$ represents an average thickness of the edge region, $R_{center}$ represents an average thickness of the center region.

In addition, the step of applying a magnetic field applies a magnetic field of 2,000G to 6,000G, and an application time may be 5 seconds to 60 seconds.

Moreover, the step of applying a magnetic field is performed by magnetic parts introduced at the upper and lower parts of the applied negative electrode slurry, the magnetic parts having a length of from 105% to 200% based on the length in the width direction of the negative electrode slurry.

In addition, the step of forming the negative electrode active layer may include: drying the negative electrode slurry; and rolling a dried negative electrode slurry.

Here, the edge region of the negative electrode active layer may have a thickness ratio of 105% to 130% based on the average thickness of the center region of the negative electrode active layer before rolling.

Advantageous Effects

The negative electrode according to the present disclosure includes a negative electrode active layer divided into a center region, an edge region, and a sliding region on a negative electrode current collector, such that the lithium precipitation at the end of the negative electrode active layer can be suppressed by the alignment (O.I) of each carbon-based negative electrode active material contained in the center region, the edge region, and the sliding region satisfying Equation 1 and Equation 2. Furthermore, a secondary battery including the same has the advantage of excellent rapid charging performance.

BRIEF DESCRIPTION OF THE DRAWINGS

FIGS. 1 and 2 are images illustrating the cross-sectional structure of a negative electrode according to the present disclosure.

FIG. 3 is an image illustrating the cross-sectional structure of an unrolled negative electrode active layer after drying of the negative electrode slurry in the manufacture of a negative electrode according to the present disclosure.

DETAILED DESCRIPTION

The present disclosure is subject to various modifications and can have many embodiments, certain of which are described in detail below.

However, this is not intended to limit the present disclosure to any particular embodiment and is to be understood to include all modifications, equivalents, or substitutions that fall within the scope of the thought and technology of the present disclosure.

The terms "comprise" or "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

Further, in the present disclosure, "comprising as a major component" may mean comprising 50 wt. % or more (or 50 volume % or more), 60 wt. % or more (or 60 volume % or more), 70 wt. % or more (or 70 volume % or more), 80 wt.

% or more (or 80 volume % or more), 90 wt. % or more (or 90 volume % or more), or 95 wt. % or more (or 95 volume % or more) of the defined component relative to the total weight (or total volume). For example, "comprising graphite as the major component of the negative electrode active material" may mean comprising at least 50 wt. %, at least 60 wt. %, at least 70 wt. %, at least 80 wt. %, at least 90 wt. %, or at least 95 wt. % graphite based on the total weight of the negative electrode active material, and in some cases may mean that the entire negative electrode active material is composed of graphite and comprises 100% graphite.

Further, as used herein, "carbon-based negative electrode active material is oriented" or "carbon-based negative electrode active material is aligned" may mean that the crystal faces of the carbon-based negative electrode active material comprising the negative electrode active material particles are distributed in a predetermined orientation relative to the surface of the negative electrode current collector, which may be different from the carbon-based negative electrode active material particles themselves being arranged to have a specific orientation within the negative electrode active layer.

In addition, "highly oriented carbon-based negative electrode active material" may mean that the carbon-based negative electrode active material contained in the negative electrode active layer is aligned at a high frequency with respect to the surface of the negative electrode current collector, and in some cases, the carbon-based negative electrode active material contained in the negative electrode active layer is aligned at a high angle with respect to the surface of the negative electrode current collector.

Furthermore, "high alignment of the carbon-based negative electrode active material" may refer to a large value of the "alignment (O.I)" referred to herein, which means that the carbon-based negative electrode active material contained in the negative electrode active layer is aligned at a low angle relative to the surface of the negative electrode current collector. Conversely, "low alignment of carbon-based negative electrode active material" means that the "alignment (O.I)" has a small value, which may indicate that the carbon-based negative electrode active material contained in the negative electrode active layer is aligned at a high angle relative to the negative electrode current collector surface.

The present disclosure will now be described in more detail.

Negative Electrode for Lithium Secondary Battery

In an exemplary embodiment, the present disclosure provides a negative electrode for lithium secondary battery including:

a negative electrode current collector; and a negative electrode active layer provided on at least one side of the negative electrode current collector and including a carbon-based negative electrode active material, wherein the negative electrode active layer is divided into:

a center region including a center part in the width direction of the negative electrode active layer, a sliding region located at the edge of the negative electrode active layer and having a thickness gradient, and an edge region located between the center region and the sliding region; and satisfies Equation 1 and Equation 2 below:

$$2.7 \leq [O.I_{edge}]/[O.I_{center}] \leq 4.8 \qquad \text{[Equation 1]}$$

$$1.5 \leq [O.I_{sliding}]/[O.I_{center}] \leq 2.6 \qquad \text{[Equation 2]}$$

in Equation 1 and Equation 2, $O.I_{edge}$ represents an alignment (O.I) at the edge region, $O.I_{center}$ represents an alignment (O.I) in the center region, $O.I_{sliding}$ represents an alignment (O.I) in the sliding region, and the alignment (O.I) represents the ratio $(I_{004}/I_{110})$ of the area of the peak representing the (0,0,4) crystal face $(I_{004})$ to the area of the peak representing the (1,1,0) crystal face $(I_{110})$ in the XRD measurement for the negative electrode active layer.

FIGS. 1 and 2 are cross-sectional views illustrating the structure of a negative electrode 100 and 200, respectively, with a negative electrode active layer provided on one side of the negative electrode current collector according to the present disclosure.

The negative electrode 100 and 200 for lithium secondary batteries according to the present disclosure include negative electrode active layers 120 and 220 including a carbon-based negative electrode active material on at least one side of the negative electrode current collector 110 and 210. The negative electrode active layers 120 and 220 are layers that implement the electrical activity of the negative electrode. The negative electrode active layers 120 and 220 are prepared by applying a negative electrode slurry including a negative electrode active material implementing an electrochemical redox reaction during charging and discharging of the battery to at least one side of the negative electrode current collector 110 and 210, followed by drying and rolling.

In this case, the negative electrode active layer 120 and 220 is divided into a center region, an edge region, and a sliding region in the width direction of the negative electrode 100 and 200. Specifically, the negative electrode active layer 120 and 220 includes a center region in the width direction, and includes a center region 121 and 221 having a ratio of at least 90% of the total length in the width direction. The center region 121 and 221 comprise the majority of the negative electrode active layer 120 and 220, and may have a ratio of at least 93%; at least 95%; at least 97%; or at least 96% to 99% of the total length in the width direction of the negative electrode active layer 120 and 220. As used herein, "width direction of the negative electrode active layer 120 and 220" may mean a direction perpendicular to the direction in which the negative electrode current collector is traveling during negative electrode manufacturing. In some cases, the "width direction of the negative electrode active layer 120 and 220" may be the same as the direction progressing from one side formed with negative electrode tabs to its opposite side in the manufactured negative electrode. The present disclosure may further increase the energy density of the negative electrode by adjusting the length ratio of the center region 121 and 221 in the negative electrode active layer 120 and 220 to the above range.

Further, an edge region 122 and 222 is located on the outer sides of the center region 121 and 221, and a sliding region 123 and 223 is located on the outer sides of the edge region 122 and 222.

In this case, the edge region and the sliding region may be disposed sequentially and continuously on both sides of the center region 121 as shown in FIG. 1. In some cases, the edge region and sliding region may be sequentially and continuously disposed on only one side of the center region 221 as shown in FIG. 2 due to the punching (or notching) of the electrode sheet during negative electrode manufacturing.

The sliding region 123 and 223 is a region having a thickness gradient located at the edge of the negative electrode active layer 120 and 220. The sliding region 123 and 223 may have a ratio of 3% or less of the total length of the negative electrode active layer 120 and 220 in the width direction. Specifically, the sliding region 123 and 223 may have a shape in which the thickness decreases outwardly in the region adjacent to the edge region 122 and 222, and may have a ratio of 2% or less; 1% or less; 0.5% or less; 0.01% to 1%; or 0.01% to 0.5% of the total length of the negative electrode active layer 120 and 220 in the width direction, considering the energy density of the negative electrode. In this case, the length ratio is a total length ratio arranged on the basis of the width direction of the negative electrode active layer 120 and 220, and when the sliding region 123 and 223 is arranged on both sides of the center region 121 as shown in FIG. 1, the length ratio of each sliding region may be halved to ½ of the length ratio.

Further, the sliding region 123 and 223 may have a thickness gradient that becomes shorter in thickness as it progresses outwardly, such that the exposed surface may have a predetermined inclination angle relative to the negative electrode current collector 110 and 210. For example, the exposed surface of the sliding region 123 and 223 may have an inclination angle of 700 or greater with respect to the negative electrode current collectors 110 and 210 such that it has a thickness gradient that decreases as it progresses outwardly. Specifically, the sliding region 123 and 223 may have an inclination angle of the exposed surface of 750 or more; 80° or more; 85° or more; 70° to 85°; 750 to 80°; 700 to 75°; relative to the negative electrode current collector 110 and 210. By adjusting the angle of inclination of the exposed surface of the sliding region 123 and 223 with respect to the negative electrode current collector 110 and 210 to the above range, the present disclosure can prevent the N/P ratio from being reversed at the end of the electrode assembly assembled with the positive electrode, and can further improve the adhesion with the separator at the negative electrode end.

Furthermore, by having a higher negative electrode active material loading amount than the center region 121 and 221, the edge region 122 and 222 can function to prevent lithium from precipitating from the end of the negative electrode active layer 120 and 220 by inhibiting the N/P ratio from becoming less than 1 when the stacking position of the negative electrode active layer is outside the negative electrode active layer inside the secondary battery.

In this case, the edge region 122 and 222 may occupy a residual length excluding the length ratio of the aforementioned center region 121 and 221 and the sliding region 123 and 223. For example, the edge region 122 and 222 may have a ratio of less than 7%; less than 5%; less than 4%; less than 2.5%; 0.09% to 3%; or 0.5% to 1% of the total length of the negative electrode active layer 120 and 220 in the width direction. The edge region 122 and 222 may be provided on both sides of the center region 121, as may the sliding region 123 and 223, such that the length ratio of each edge region may be halved to ½ of the length ratio.

Furthermore, the negative electrode 100 and 200 according to the present disclosure have the characteristic of having excellent fast charging performance. The negative electrode 100 and 200 can prevent lithium from precipitating from the end of the negative electrode active layer 120 and 220 due to the reversal of the N/P ratio between the negative electrode and positive electrode by controlling the loading amount per unit area of the carbon-based negative electrode active material that the edge region 122 and 222 has to be higher than the loading amount per unit area of the carbon-based negative electrode active material that the center region 121 and 221 has, as described above. However, in this case, the edge region 122 and 222 with a higher loading amount of carbon-based negative electrode active material may increase the structural tortuosity of the negative electrode active layer compared to the rest of the regions, thereby increasing the travel distance of the lithium ions and decreasing the diffusion rate, which may cause lithium to precipitate from the surface of the negative electrode during rapid charging. Therefore, the negative electrode 100 and 200 of the present disclosure solves this problem by orienting the carbon-based negative electrode active material contained in the negative electrode active layer 120 and 220 so that the crystal face angle of the negative electrode active layer 120 and 220 with respect to the surface of the negative electrode current collector 110 and 210 is reduced, but the carbon-based negative electrode active material oriented in each region of the negative electrode active layer 120 and 220 has a predetermined tendency. Here, the orientation and/or alignment of the carbon-based negative electrode active material (e.g., graphite) can be determined by crystal face analysis of the carbon-based negative electrode active material (C-A) contained in the negative electrode active layer.

In one example, the negative electrode active layer 120 and 220 may satisfy Equation 1 and Equation 2 below:

$$2.7 \leq [O.I_{edge}]/[O.I_{center}] \leq 4.8 \qquad \text{[Equation 1]}$$

$$1.5 \leq [O.I_{sliding}]/[O.I_{center}] \leq 2.6 \qquad \text{[Equation 2]}$$

in Equation 1 and Equation 2, $O.I_{edge}$ represents the alignment (O.I) at the edge region, $O.I_{center}$ represents the alignment (O.I) in the center region, $O.I_{sliding}$ represents the alignment (O.I) in the sliding region, and the alignment (O.I) represents the ratio ($I_{004}/I_{110}$) of the area of the peak representing the (0,0,4) crystal face ($I_{004}$) to the area of the peak representing the (1,1,0) crystal face ($I_{110}$) in the XRD measurement for the negative electrode active layer.

The alignment (O.I) of the carbon-based negative electrode active material (C-A) may be an indicator of the degree to which the crystal structure of the spherical carbon-based negative electrode active material is oriented in a certain direction, specifically with respect to the surface of the negative electrode current collector, as measured by X-ray diffraction (XRD). More specifically, the negative electrode active layer can be characterized by X-ray diffraction measurements that show peaks for the carbon-based negative electrode active material graphite at $2\theta=26.5\pm0.2°$, $42.4\pm0.2°$, $43.4\pm0.2°$, $44.6\pm0.2°$, $54.7\pm0.2°$, and $77.5\pm0.2°$, which represent the (0,0,2) face, (1,0,0) face, (1,0,1)R face, (1,0,1)H face, (0,0,4) face, and (1,1,0) face, respectively. The peak at $2\theta=43.4\pm0.2°$ can also be seen as an overlap of the peaks corresponding to the (1,0,1)R face of a carbon-based negative electrode active material (C-A) and the (1,1,1) face of a current collector, such as copper (Cu).

Among them, the ratio of the area of the peak at $2\theta=54.7\pm0.2°$, which represents the (0,0,4) face, and the peak at $2\theta=77.5\pm0.2°$, which represents the (1,1,0) face, or more specifically, the ratio of the areas obtained by integrating the intensities of the above peaks, can be used to measure the alignment (O.I) of the carbon-based negative electrode active material (C-A).

Here, the peak at $2\theta=54.7\pm0.2°$ is a peak representing the (0,0,4) face of the crystal faces of graphite having a slope with the negative electrode current collector. Thus, the alignment (O.I) may mean that the slope with respect to the surface of the negative electrode current collector is close to 90° when the value is close to 0, and the slope with respect to the surface of the negative electrode current collector is close to 0° or 180° when the value is larger. In other words, the negative electrode active layer according to the present disclosure may have a lower alignment (O.I) of the carbon-based negative electrode active material (C-A) such that the carbon-based negative electrode active material (C-A) has a high angle with respect to the negative electrode current collector, such as an angle of 60° or more, 70° or more, 70°-90°, 80°-90°, 65°-85°, or 70°-85° with respect to the negative electrode current collector, compared to a case where the carbon-based negative electrode active material (C-A) is aligned at a low angle.

Considering this, Equation 1 shows that the alignment of the carbon-based negative electrode active material in the center region (O.I$_{center}$) has a smaller value than the alignment of the carbon-based negative electrode active material in the edge region (O.I$_{edge}$). This means that the carbon-based negative electrode active material in the center region is aligned at a higher angle to the surface of the negative electrode current collector than the carbon-based negative electrode active material in the edge region. By having the carbon-based negative electrode active material in the center region aligned at a higher angle to the surface of the negative electrode current collector than the carbon-based negative electrode active material in the edge region, the negative electrode active layer 120 and 220 of the present disclosure can satisfy Equation 1 with a ratio of 2.7 to 4.8 (i.e., $2.7\leq[O.I_{edge}]/[O.I_{center}]\leq4.8$), more specifically, 2.7 to 4.8 (i.e., $2.7\leq[O.I_{edge}]/[O.I_{center}]\leq4.8$); 2.9 to 4.5 (i.e., $2.9\leq[O.I_{edge}]/[O.I_{center}]\leq4.5$); 3.0 to 4.5 (i.e., $3.0\leq[O.I_{edge}]/[O.I_{center}]\leq4.5$); 2.9 to 3.8 (i.e., $2.9\leq[O.I_{edge}]/[O.I_{center}]\leq3.8$); 3.8 to 4.6 (i.e., $3.8\leq[O.I_{edge}]/[O.I_{center}]\leq4.6$); or 3.1 to 4.2 (i.e., $3.1\leq[O.I_{edge}]/[O.I_{center}]4.2$).

In addition, Equation 2 shows that the alignment of the carbon-based negative electrode active material in the center region (O.I$_{center}$) has a smaller value than the alignment of the carbon-based negative electrode active material in the sliding region (O.I$_{sliding}$). This means that the carbon-based negative electrode active material in the center region is aligned at a higher angle to the surface of the negative electrode current collector than the carbon-based negative electrode active material in the sliding region. By having the carbon-based negative electrode active material in the center region aligned at a higher angle to the surface of the negative electrode current collector than the carbon-based negative electrode active material in the sliding region, the negative electrode active layer 120 and 220 of the present disclosure can satisfy Equation 2 with a ratio of 1.5 to 2.6 (1.5≤ $[O.I_{siding}]/[O.I_{center}]\leq2.6$), more specifically, 1.8 to 2.6 (1.8≤ $[O.I_{sliding}]/[O.I_{center}]\leq2.6$); 1.7 to 2.3 ($1.7\leq[O.I_{sliding}]/[O.I_{center}]\leq2.3$); 2.2 to 2.5 ($2.2\leq[O.I_{sliding}]/[O.I_{center}]\leq2.5$);

1.9 to 2.2 ($1.9\leq[O.I_{sliding}]/[O.I_{center}]\leq2.2$); or 2.0 to 2.5 ($2.0\leq[O.I_{sliding}]/[O.I_{center}]\leq2.5$).

Each region of the negative electrode active layer 120 and 220 may have an alignment (O.I) of the carbon-based negative electrode active material (C-A) satisfying a predetermined range such that the conditions of Equations 1 and 2 are satisfied. This allows the average alignment of the carbon-based negative electrode active material C-A contained in the negative electrode active layer 120 and 220 as a whole to be kept low. Specifically, the center region 121 and 221 of the negative electrode active layer 120 and 220 may have an alignment (O.I$_{center}$) of the carbon-based negative electrode active material (C-A) contained in the region of 0.7 to 1.5, more specifically, 0.7 to 1.3; 0.7 to 1.0; 0.9 to 1.2; or 0.8 to 1.1. In this case, the alignment (O.I$_{center}$) of the center region 121 and 221 may have a deviation of 5% or less from the average alignment of the negative electrode active layer 120 and 220.

Further, the alignment (O.I$_{edge}$) of the carbon-based negative electrode active material contained in the edge region 122 and 222 may be greater than the alignment (O.I$_{center}$) of the carbon-based negative electrode active material contained in the center region 121 and 221. This is because the edge region 122 and 222 has a relatively high loading amount of carbon-based negative electrode active material compared to the center region 121 and 221, which may cause the alignment (O.I$_{edge}$) to be somewhat higher than the alignment (O.I$_{center}$) of the carbon-based negative electrode active material contained in the center region due to the overcrowding of the carbon-based negative electrode active material contained in the edge region 122 and 222 during the rolling after the orientation of the carbon-based negative electrode active material.

By adjusting the alignment (O.I) of the carbon-based negative electrode active material (C-A) contained in the center region 121 and 221, the edge region 122 and 222, and the sliding region 123 and 223 of the negative electrode active layer 120 and 220, respectively, as described above, the present disclosure can obtain ion migration channels in which lithium ions can travel shorter distances within each region. Accordingly, the negative electrode according to the present disclosure can prevent an increase in resistance due to a long travel distance of lithium ions during rapid charging, thereby preventing a decrease in charging performance, and can prevent precipitation of lithium from the surface of the negative electrode.

Meanwhile, the average thickness of the negative electrode active layer 120 and 220 may be from 100 μm to 300 μm, more specifically, from 100 μm to 250 μm; or from 130 μm to 190 μm, and the average thickness may be the same as the average thickness of the center region 121 and 221. By adjusting the average thickness of the negative electrode active layer 120 and 220 to the above ranges, the present disclosure can facilitate controlling the orientation of the carbon-based negative electrode active material (C-A) contained in each region, which can improve the rapid charging characteristics of the battery including the negative electrode 100 and 200.

Furthermore, the negative electrode active layer 120 and 220 may have a structure in which two separate layers are laminated, depending on the battery model or product application to which the negative electrode of the present disclosure is applied, but is not limited thereto. In this case, the negative electrode according to the present disclosure may have a structure in which a first negative electrode active layer (not shown) is provided on the negative electrode current collector 110 and 210, and a second negative electrode active layer (not shown) is provided on the first negative electrode active layer. In this case, the first negative electrode active layer and the second negative electrode active layer contain a carbon-based negative electrode active material (C-A), but the carbon-based negative electrode active material (C-A) contained in each layer may be the same or different.

Furthermore, the negative electrode active layer 120 and 220 include a carbon-based negative electrode active material (C-A) as a negative electrode active material to implement electrical activity through a reversible redox reaction during charging and discharging of the battery.

The carbon-based negative electrode active material (C-A) refers to a material having carbon atoms as its main component, and such a carbon-based negative electrode active material (C-A) may include graphite. The graphite may include one or more among natural graphite or synthetic graphite. Preferably, it may include natural graphite, or a mixture of natural graphite and synthetic graphite.

Preferably, the carbon-based negative electrode active material (C-A) is a spherical graphite assembly formed by aggregation of a plurality of flaky graphite. The flaky graphite includes natural graphite, synthetic graphite, mesophase calcined carbon (bulk mesophase) based on tar and pitch, graphitized coke (raw coke, green coke, pitch coke, needle coke, petroleum coke, etc.), and the like, and is preferably assembled using a plurality of highly crystalline natural graphite. Furthermore, one graphite assembly may be formed by assembling from 2 to 100, preferably from 3 to 20, pieces of flaky graphite.

Furthermore, the carbon-based negative electrode active material (C-A) may have an average particle diameter ($D_{50}$) of 0.5 μm to 20 μm, and more specifically, may have an average particle diameter ($D_{50}$) of 0.5 μm to 15 μm; 0.5 μm to 10 μm; 5 μm to 20 μm; 10 μm to 20 μm; 12 μm to 18 μm; 2 μm to 7 μm; 0.5 μm to 5 μm; or 1 μm to 3 μm.

The average particle diameter of natural graphite may be advantageous to make the particle diameter smaller to maximize the disorder in the direction of expansion for each particle to prevent expansion of the particles due to charging of the lithium ions. However, when the particle diameter of natural graphite is less than 0.5 μm, a large amount of binder may be required due to the increase in the number of particles per unit volume. On the other hand, if the average particle diameter exceeds 20 μm, the expansion becomes severe, resulting in poor interparticle cohesion and particle-to-current collector cohesion with repeated charge and discharge, which can significantly reduce the cycling characteristics.

Furthermore, the negative electrode active layer according to the present disclosure may optionally further include, in addition to the main component, a carbon-based negative electrode active material (C-A), a conductive material, a binder, other additives, etc. as required.

The conductive material may include one or more among carbon black, acetylene black, ketjen black, carbon nanotubes, carbon fiber, and the like, but is not limited thereto.

In one example, the negative electrode active layer may contain carbon black, carbon nanotubes, carbon fibers, or the like as a conductive material alone or in combination.

In this case, the content of the conductive material may be from 0.1 to 10 parts by weight, based on a total of 100 parts by weight of the negative electrode active layer. Specifically, the content of the conductive material may be 0.1 to 8 parts by weight, 0.1 to 5 parts by weight, 0.1 to 3 parts by weight, 2 to 6 parts by weight, or 0.5 to 2 parts by weight. By controlling the content of the conductive material to the above range, the present disclosure can prevent the resistance of the negative electrode from increasing due to a low content of the conductive material, thereby reducing the charging capacity. Furthermore, the present disclosure can prevent the content of the negative electrode active material from decreasing due to an excessive amount of conductive material, resulting in a decrease in the charging capacity, or a decrease in the rapid charging characteristics due to an increase in the loading amount of the negative electrode active layer.

Furthermore, the binder can be suitably applied as a component that assists in the bonding of the negative electrode active material and the conductive material and the binding to the current collector to the extent that it does not degrade the electrical properties of the electrode. Specifically, the binder may include one or more selected from the group consisting of vinylidene fluoride-hexafluoropropylene copolymer (PVDF-co-HFP), polyvinylidenefluoride (PVdF), polyacrylonitrile, polymethylmethacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, ethylene-propylene-diene monomer, sulfonated ethylene-propylene-diene monomer, styrene butadiene rubber (SBR), and fluorinated rubber.

The content of the binder may be from 0.1 to 10 parts by weight, and more specifically from 0.1 to 8 parts by weight, from 0.1 to 5 parts by weight, from 0.1 to 3 parts by weight, or from 2 to 6 parts by weight, based on a total of 100 parts by weight of the negative electrode active layer. By controlling the content of the binder contained in the negative electrode active layer to the above range, the present disclosure can prevent the adhesion of the active layer from deteriorating due to a low content of binder or the electrical properties of the electrode from deteriorating due to an excess of binder.

Furthermore, the negative electrode current collector is not particularly limited as long as it has a high conductivity without causing chemical changes in the battery, and for example, copper, stainless steel, nickel, titanium, calcined carbon, and the like can be used, and in the case of copper or stainless steel, those that are surface treated with carbon, nickel, titanium, silver, and the like can also be used. Furthermore, the average thickness of the negative electrode current collector may be suitably applied from 1 to 500 μm, considering the conductivity and total thickness of the negative electrode being manufactured.

Lithium Secondary Battery

Furthermore, in one embodiment, the present disclosure provides a lithium secondary battery including an electrode assembly including a positive electrode, a negative electrode of the present disclosure as described above, and a separator disposed between the positive electrode and negative electrode.

The lithium secondary battery according to the disclosure includes: an electrode assembly having a plurality of positive electrodes, separators, and negative electrodes each arranged sequentially; and an electrolyte composition having a lithium salt and electrolyte additives dissolved in a non-aqueous organic solvent. Here, the lithium secondary battery includes a negative electrode having a structure in which a negative electrode active layer is laminated on the negative electrode current collector, the negative electrode active layer being divided into a center region, an edge region, and a sliding region, wherein an alignment (O.I) of each carbon-based negative electrode active material contained in the center region, edge region, and sliding region satisfies Equation 1 and Equation 2. Accordingly, the lithium secondary battery has the advantage of having excellent rapid charging characteristics while lithium precipitation does not occur at the end of the negative electrode active layer during charging and discharging.

In this case, the negative electrode has the same configuration as the configuration described above, so the specific description is omitted.

Further, the positive electrode may be provided with a positive electrode active layer prepared by applying, drying, and pressing a slurry including a positive electrode active material onto the positive electrode current collector. Here, the positive electrode active layer may optionally further include a conductive material, a binder, other additives, etc. in addition to the positive electrode active material as required.

The positive electrode active material may include one or more of the lithium metal oxides represented by Chemical Formula 1 and Chemical Formula 2 below, which are capable of reacting electrochemically on the positive electrode collector to reversibly intercalate and deintercalate lithium ions:

$$Li_x[Ni_yCo_zMn_wM^1_v]O_2 \qquad \text{[Chemical Formula 1]}$$

$$LiM^2_pMn_qP_rO_4 \qquad \text{[Chemical Formula 2]}$$

in Chemical Formula 1 and Chemical Formula 2, $M^1$ is one or more of the following elements: W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w, and y are $1.0 \leq x \leq 1.30$, $0.5 \leq y < 1$, $0 < z \leq 0.3$, $0 < w \leq 0.3$, and $0 \leq v \leq 0.1$, respectively, where y+z+w+v=1, $M^2$ is Ni, Co, or Fe, p is $0.05 \leq p \leq 1.0$, q is either 1−p or 2−p, and r is 0 or 1.

Lithium metal oxides, represented by Chemical Formula 1 and Chemical Formula 2, are materials containing a high content of nickel (Ni) and manganese (Mn), respectively, and when used as a positive electrode active material, have the advantage of being able to stably supply high capacity and/or high voltage electricity compared to conventionally used positive electrode active materials such as lithium iron phosphate ($LiFeO_4$).

In this case, the lithium metal oxide represented by Chemical Formula 1 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, and the like, and the lithium metal oxide represented by Chemical Formula 2 may include $LiNi_{0.7}Mn_{1.3}O_4$; $LiNi_{0.5}Mn_{1.5}O_4$; $LiNi_{0.3}Mn_{1.7}O_4$; $LiFePO_4$, $LiFe_{0.7}Mn_{0.3}PO_4$, and the like, which may be used alone or in combination.

Furthermore, the positive electrode active material may be included in an amount of at least 85 parts by weight based on a total of 100 parts by weight of the positive electrode active layer. More specifically, the positive electrode active material may be included in an amount of at least 90 parts by weight, at least 93 parts by weight, or at least 95 parts by weight based on a total of 100 parts by weight of the positive electrode active layer.

Furthermore, the positive electrode active layer may further include a conductive material, a binder, other additives, etc. in addition to the positive electrode active material.

In this case, the conductive material used to improve the electrical performance of the positive electrode may be any material conventionally used in the art, but more particularly may include at least one type selected from the group consisting of natural graphite, synthetic graphite, carbon black, acetylene black, denka black, ketjen black, super-P, channel black, furnace black, lamp black, summer black, graphene, and carbon nanotubes.

Furthermore, the conductive material may be included in an amount of 0.1 to 5 parts by weight based on a total of 100 parts by weight of each positive electrode active layer. More specifically, the conductive material may be included in an amount of 0.1 to 4 parts by weight; 2 to 4 parts by weight; 1.5 to 5 parts by weight; 1 to 3 parts by weight; 0.1 to 2 parts by weight; or 0.1 to 1 part by weight based on a total of 100 parts by weight of the positive electrode active layer.

Furthermore, the binder serves to bind the positive electrode active material, positive electrode additive, and conductive material to each other, and may be used without limitation as long as it has this function. Specifically, the binder may include one or more resins selected from the group consisting of polyvinylidene fluoride-hexafluoropropylene copolymer (PVdF-co-HFP), polyvinylidenefluoride (PVdF), polyacrylonitrile, polymethylmethacrylate, and copolymers thereof. In one example, the binder may include polyvinylidenefluoride.

Additionally, the binder may be included in an amount of 1 to 10 parts by weight based on a total of 100 parts by weight of each positive electrode active layer, more particularly from 2 to 8 parts by weight; or from 1 to 5 parts by weight.

The total thickness of the positive electrode active layer is not particularly limited, but may be from 50 μm to 300 μm, more specifically from 100 μm to 200 μm; from 80 μm to 150 μm; from 120 μm to 170 μm; from 150 μm to 300 μm; from 200 μm to 300 μm; or from 150 μm to 190 μm.

Furthermore, as a positive electrode current collector, the positive electrode may use one with a high conductivity without causing chemical changes in the battery. For example, stainless steel, aluminum, nickel, titanium, calcined carbon, and the like can be used, and in the case of aluminum or stainless steel, those that are surface treated with carbon, nickel, titanium, silver, and the like can also be used. Furthermore, the average thickness of the current collector may be suitably applied from 3 μm to 500 μm, considering the conductivity and total thickness of the positive electrode to be manufactured.

Furthermore, the separator interposed between the positive electrode and the negative electrode of each unit cell is an insulating thin film having high ion permeability and mechanical strength, and it is not particularly limited as long as it is those conventionally used in the art, but may include one or more polymers such as chemically resistant and hydrophobic polypropylene; polyethylene; polyethylene-propylene copolymers. The separator may be in the form of a porous polymeric substrate, such as a sheet or nonwoven fabric including the polymer described above, and in some cases may be in the form of a composite separator in which organic or inorganic particles are coated by an organic binder on the porous polymeric substrate. Furthermore, the separator may have an average pore diameter of 0.01 to 10 μm, and an average thickness of 5 to 300 μm.

Meanwhile, the lithium secondary battery according to the present disclosure may be shaped, without being particularly limited, to include a stack-type; a zigzag-type; or a zigzag-stack-type electrode assembly. As one example, the lithium secondary battery according to the present disclosure may be a pouch-type secondary battery or a prismatic secondary battery.

15 16

Manufacturing Method of a Negative Electrode

Furthermore, in an exemplary embodiment, the present disclosure provides a manufacturing method of a negative electrode for lithium secondary battery including:

applying a negative electrode slurry including a carbon-based active material on the negative electrode current collector;

applying a magnetic field to the applied negative electrode slurry; and drying a negative electrode slurry applied with a magnetic field to form a negative electrode active layer, wherein the negative electrode active layer is divided into: a center region including a center part in the width direction of the negative electrode active layer, a sliding region located at the edge of the negative electrode active layer and having a thickness gradient, and an edge region located between the center region and the sliding region; and satisfies Equation 1 and Equation 2 below:

$$2.7 \leq [O.I_{edge}]/[O.I_{center}] \leq 4.8 \qquad \text{[Equation 1]}$$

$$1.5 \leq [O.I_{sliding}]/[O.I_{center}] \leq 2.6 \qquad \text{[Equation 2]}$$

in Equation 1 and Equation 2, $O.I_{edge}$ represents an alignment (O.I) at the edge region, $O.I_{center}$ represents an alignment (O.I) in the center region, $O.I_{sliding}$ represents an alignment (O.I) in the sliding region, and the alignment (O.I) represents the ratio $(I_{004}/I_{110})$ of the area of the peak representing the (0,0,4) crystal face $(I_{004})$ to the area of the peak representing the (1,1,0) crystal face $(I_{110})$ in the XRD measurement for the negative electrode active layer.

A manufacturing method of a negative electrode according to the present disclosure includes applying a negative electrode slurry including a carbon-based negative electrode active material on a negative electrode current collector, and applying a magnetic field to the surface of the applied negative electrode slurry to align the carbon-based negative electrode active material in the negative electrode slurry at a predetermined angle with respect to the surface of the negative electrode current collector. The negative electrode can then be manufactured by drying the negative electrode slurry with the decreased alignment of the carbon-based negative electrode active material to form a negative electrode active layer.

Here, the step of applying the negative electrode slurry includes coating the surface of the moving negative electrode current collector by discharging a negative electrode slurry containing a carbon-based negative electrode active material, and may be applied in any manner conventionally applied in the art, without limitation. Preferably, the step of applying the negative electrode slurry may utilize a die coating method. The die coating method may be performed by means of a slot die having a shim for controlling the discharge conditions of the negative electrode slurry. In this case, by controlling the shape of the shim, and the like, it is possible to easily control the loading amount, application thickness, etc. of the negative electrode slurry applied on the negative electrode current collector.

Furthermore, the step of applying the negative electrode slurry may apply the negative electrode slurry to satisfy Equation 3 below to prevent lithium from precipitating from the negative electrode active layer end during charging and discharging of the secondary battery:

$$R_{sling} < R_{center} < R_{edge} \qquad \text{[Equation 3]}$$

in Equation 3, $R_{sliding}$ represents an average thickness of the sliding region, $R_{edge}$ represents an average thickness of the edge region, $R_{center}$ represents an average thickness of the center region.

Equation 3 shows a correlation between the average thickness of the negative electrode slurry applied to each region, such that the negative electrode slurry applied according to the present disclosure may have a thicker average thickness in the edge region 122 than the average thickness in the center region 121, and a tendency for the average thickness to decrease significantly along a thickness gradient in the sliding region 123, as shown in FIG. 3. As used herein, "average thickness" may be measured using a confocal microscope, and the method may be different for each region. Specifically, for the center region and the edge region, it may mean measuring the thickness at three or more random points and calculating an average value from the measured values. In the case of the sliding region, it may mean measuring the thickness at a point where the length of the sliding region is ½ based on the length of the applied negative electrode slurry in the width direction.

For example, the center region 121 and 221 of the negative electrode slurry may have an average thickness of 180±3 μm, the edge region 122 and 222 may have an average thickness of 210±3 μm, and the sliding region 123 and 223 may have an average thickness of 120±3 μm.

By controlling the average thickness of each region of the negative electrode slurry applied on the negative electrode current collector as described above, the present disclosure can easily control the loading amount of the carbon-based negative electrode active material per region even if the average thickness of each region becomes uniform after rolling. Specifically, even if the average thicknesses of the center region 121 and 221 and the edge region 122 and 222 of the negative electrode active layer are the same or similar after rolling, the loading amount per unit area of the edge region 122 and 222 may be greater than the loading amount per unit area of the center region 121 and 221.

Meanwhile, the step of applying a magnetic field to the negative electrode slurry may be a step of orienting the crystal faces of the carbon-based negative electrode active material contained in the negative electrode slurry to have a predetermined angle with respect to the negative electrode current collector. For this purpose, the step of applying the magnetic field may be applied by magnetic parts disposed on the upper and lower parts of the negative electrode collector, which is moved as the negative electrode slurry is applied to its surface. In this case, the alignment (O.I) of the carbon-based negative electrode active material contained in the negative electrode slurry may be controlled by the strength of the applied magnetic field or the time of exposure to the magnetic field. Accordingly, the step of applying the magnetic field may be performed under predetermined magnetic field strength and time conditions.

Specifically, the step of applying a magnetic field may include applying a magnetic field of 2,000 G (Gauss) to 6,000 G (Gauss). Specifically, the step of applying a magnetic field may include applying a magnetic field with a strength of 2,500 G to 5,500 G; 3,000 G to 5,500 G; 3,500 G to 5,500 G; 4,000 G to 5,500 G; 3,500 G to 4,500 G; or 4,500 G to 5,000 G.

Further, the step of applying the magnetic field may be performed for a period of from 5 seconds to 60 seconds, more specifically, from 10 seconds to 60 seconds; from 10 seconds to 30 seconds; from 30 seconds to 60 seconds; from 40 seconds to 50 seconds; from seconds to 35 seconds; or from 10 seconds to 50 seconds.

In one example, the step of applying the magnetic field may include applying a magnetic field of 4,700±100 G to the negative electrode slurry for 12 seconds to 33 seconds.

Further, the step of applying the magnetic field may be performed by magnetic parts introduced on the upper and lower parts of the applied negative electrode slurry, as mentioned above, but the size of the magnetic parts may be adjusted to be larger than the size of the negative electrode slurry so that the magnetic field applied to the negative electrode slurry can be applied uniformly over the entire surface of the negative electrode slurry. For example, the magnetic part may have a length ratio of 105% to 200% based on the length of the negative electrode slurry in the width direction, and more specifically may have a length ratio of 110% to 180%; 110% to 160%; 110% to 140%; 110% to 130%; 130% to 150%; or 105% to 120% based on the length of the negative electrode slurry in the width direction.

In the step of applying a magnetic field, the present disclosure may control the regional orientation of the carbon-based negative electrode active material contained in the negative electrode slurry to satisfy Equations 1 and 2 by controlling the magnetic field strength, application time, and/or magnetic part size as described above.

Further, the step of forming the negative electrode active layer may include: drying the negative electrode slurry; and rolling the dried negative electrode slurry.

In this case, the step of drying the negative electrode slurry may be applied in a manner that is capable of maintaining the orientation of the carbon-based negative electrode active material contained within the negative electrode active layer, without being particularly limited.

For example, the drying may be performed by applying thermal energy to the negative electrode slurry using a hot air dryer, a vacuum oven, or the like to dry the negative electrode slurry.

Further, the step of rolling the dried negative electrode slurry is a step of increasing the density of the negative electrode active layer by applying pressure to the dried negative electrode slurry using a roll press or the like. In this case, the rolling may be performed at a temperature condition higher than room temperature.

More specifically, the rolling may be performed at a temperature of from 50° C. to 100° C., more specifically from 60° C. to 100° C.; 75° C. to 100° C.; 85° C. to 100° C.; 50° C. to 90° C.; 60° C. to 80° C.; or 65° C. to 90° C. More particularly, the rolling may be performed at a rolling speed of 2 m/s to 7 m/s, more particularly at a rolling speed of 2 m/s to 6.5 m/s; 2 m/s to 6 m/s; 2 m/s to 5.5 m/s; 2 m/s to 5 m/s; 2 m/s to 4.5 m/s; 2 m/s to 4 m/s; 2.5 m/s to 4 m/s; 2.5 m/s to 3.5 m/s; 3.5 m/s to 5 m/s; 5 m/s to 7 m/s; 5.5 m/s to 6.5 m/s; or 6 m/s to 7 m/s. Furthermore, the rolling may be performed under a pressure condition of 50 MPa to 200 MPa, more specifically, under a pressure condition of 50 MPa to 150 MPa; 50 MPa to 100 MPa; 100 MPa to 200 MPa; 150 MPa to 200 MPa; or 80 MPa to 140 MPa.

By performing the rolling of the dried negative electrode slurry under the above temperature, speed and/or pressure conditions, the present disclosure can increase the energy density of the negative electrode while minimizing the change in the alignment of the carbon-based negative electrode active material contained in the negative electrode active layer formed.

Hereinafter, the present disclosure will be described in more detail by way of examples and experimental examples.

However, the following examples and experimental examples are illustrative of the present disclosure, and the present disclosure is not limited to the following examples and experimental examples.

Examples 1 to 2 and Comparative Examples 1 to 2. Preparation of Negative Electrode for Lithium Secondary Battery A negative electrode for a lithium secondary battery was prepared under the conditions shown in Table 1 below.

First, natural graphite (average particle diameter: 10±1 μm) and synthetic graphite (average particle diameter: 8±1 μm) were each prepared as carbon-based negative electrode active materials, and a negative electrode slurry was prepared using the prepared carbon-based negative electrode active material.

Specifically, mixed graphite was prepared as a negative electrode active material by mixing natural graphite and synthetic graphite in a weight ratio of 1-3:7-9, with carbon black as a conductive material and carboxymethylcellulose (CMC) and styrene butadiene rubber (SBR) as binders. Then, 95 parts by weight of mixed graphite, 1 part by weight of carbon black, 1.5 parts by weight of carboxymethylcellulose (CMC), and 2.5 parts by weight of styrene butadiene rubber (SBR) were mixed with water to achieve 50% solid content to prepare a negative electrode slurry.

Once the negative electrode slurry was prepared, the negative electrode slurry was cast using a die coater onto a copper thin plate (thickness: 10 μm) that was being transferred in a roll-to-roll motion (transfer speed: 5 m/min). The negative electrode slurry was cast so that the average thickness of the negative electrode slurry was 190 μm along the transfer direction of the copper sheet, and the average thickness of each region of the negative electrode active layer before rolling was controlled as shown in Table 1 by varying the shape of the shim provided in the die coater.

At this time, the cross-sectional structure of the applied negative electrode slurry was as shown in FIG. 1, and each negative electrode slurry was set so that a region having a length ratio of 98.5% based on the length of the negative electrode slurry in the width direction at the center as the center region. Then, the regions disposed with a total length ratio of 1.0% on both sides of the center region were set as edge regions (each with a length ratio of 0.5%), and the regions with a length ratio of 0.5% on the outer side of the edge regions were set as sliding regions (each with a length ratio of 0.25%).

In measuring the average thickness of each set region, the average thickness of the center and edge regions of the negative electrode slurry was obtained by measuring the confocal thickness of each region three times and calculating the average value. In addition, the average thickness of the sliding region of the negative electrode slurry was defined as the thickness at the point where the length of the sliding region is ½ based on the length of the negative electrode slurry in the width direction.

After the average thickness of each region of the negative electrode slurry was measured, permanent magnets with a length ratio of 110 to 120% based on the length of the negative electrode slurry in the width direction were placed on the upper part of the applied negative electrode slurry and the lower part of the negative electrode current collector, and a magnetic field of 4,700±100 G was applied for 15 seconds, and the negative electrode slurry with the magnetic field applied was hot air-dried to form a negative electrode active layer. The formed negative electrode active layer was rolled at a pressure of 100-150 MPa and a transfer rate of 3 m/s at 50±1° C. to prepare a negative electrode for lithium secondary battery.

In addition, for each manufactured negative electrode, X-ray diffraction spectroscopy (XRD) was performed to measure the spectra of each region of the negative electrode active layer. The measurement conditions for X-ray diffraction (XRD) were as follows:

Target: Cu (Kα-ray) graphite monochromator

Slit: Divergence slit=1 degree, Receiving slit=0.1 mm, Scatter slit=1 degree

Measurement zone: (1,1,0) face: $76.5° < 2\theta < 78.5°$/ (0,0,4) face: $53.5° < 2\theta < 56.0°$.

From the spectra measured under the above conditions, the respective areas of the peaks representing the (0,0,4) and (1,1,0) crystal faces were calculated, and the ratio of these areas ($I_{004}/I_{110}$) was calculated to obtain the alignment (O.I) of the mixed graphite by region. The calculated values are shown in Table 1 below.

TABLE 1

| | | Example 1 | Example 2 | Comparative Example 1 | Comparative Example 2 |
|---|---|---|---|---|---|
| Center region | Average thickness [µm] | 180 | 160 | 180 | 180 |
| | $O.I_{center}$ | 0.90 | 1.32 | 0.90 | 0.91 |
| Edge region | Average thickness [µm] | 210 | 190 | 185 | 240 |
| | $O.I_{edge}$ | 3.75 | 3.98 | 1.56 | 4.51 |
| Sliding region | Average thickness [µm] | 120 | 115 | 100 | 130 |
| | $O.I_{sliding}$ | 2.18 | 2.67 | 1.32 | 2.65 |
| $[O.I_{edge}]/[O.I_{center}]$ | | 4.17 | 3.15 | 1.73 | 4.96 |
| $[O.I_{sliding}]/[O.I_{center}]$ | | 2.42 | 2.02 | 1.47 | 2.91 |

Comparative Examples 3 and 4. Preparation of Negative Electrode for Lithium Secondary Battery A negative electrode for a lithium secondary battery was prepared by the same method as in Example 1, except that a magnetic field was not applied after casting of the negative electrode slurry, and a magnetic field was applied using a permanent magnet having a length ratio of 95 to 100% based on the length of the negative electrode slurry in the width direction.

During negative electrode manufacturing, ① the average thickness of each region of the applied negative electrode slurry and ② the alignment (O.I) of the carbon-based negative electrode active material contained in each region after rolling were measured using the same method as in Example 1, and the measured results are shown in Table 2 below.

TABLE 2

| | | Comparative Example 3 | Comparative Example 4 |
|---|---|---|---|
| Whether magnetic field was applied | | ○ | X |
| Center region | Average thickness [µm] | 180 | 180 |
| | $O.I_{center}$ | 0.9 | 5.41 |
| Edge region | Average thickness [µm] | 210 | 210 |
| | $O.I_{edge}$ | 1.05 | 6.12 |
| Sliding region | Average thickness [µm] | 120 | 120 |
| | $O.I_{sliding}$ | 1.32 | 4.18 |
| $[O.I_{edge}]/[O.I_{center}]$ | | 1.17 | 1.13 |
| $[O.I_{sliding}]/[O.I_{center}]$ | | 1.47 | 0.77 |

Examples 3 to 4 and Comparative Examples 5 to 8. Preparation of Lithium Secondary Battery $LiNi_{0.7}Co_{0.1}Mn_{0.1}Al_{0.1}O_2$ with a particle size of 5 µm was prepared as a positive electrode active material, mixed with a carbon-based conductive material and polyvinylidene fluoride as a binder in a weight ratio of 94:3:3 in N-methyl pyrrolidone (NMP) to form a slurry, applied to an aluminum thin plate, dried in a 120° C. vacuum oven, and rolled to prepare a positive electrode.

The lithium secondary battery was assembled by interposing a separator comprising 18 µm of polypropylene between the positive electrode obtained above and the negative electrode prepared in Examples 1-2 and Comparative Examples 1-4, respectively, inserting it into a case, and then injecting an electrolyte composition.

Here, the type of negative electrode applied to each lithium secondary battery is shown in Table 3 below.

TABLE 3

| | Types of negative electrode applied |
|---|---|
| Example 3 | Negative electrode prepared in Example 1 |
| Example 4 | Negative electrode prepared in Example 2 |
| Comparative Example 5 | Negative electrode prepared in Comparative Example 1 |
| Comparative Example 6 | Negative electrode prepared in Comparative Example 2 |
| Comparative Example 7 | Negative electrode prepared in Comparative Example 3 |
| Comparative Example 8 | Negative electrode prepared in Comparative Example 4 |

Experimental Examples

To evaluate the performance of the negative electrode according to the present disclosure, the following experiments were performed.

a) Evaluating Whether Lithium Precipitation Occurred

The lithium secondary batteries prepared in Examples 3-4 and Comparative Examples 5-8 were charged to SOC 80% by applying a current of 1.5 C-rate and measuring the voltage change and dV/dQ according to SOC. The presence of a voltage plateau in the measured voltage change, or a bimodal shape of the graph plotting dV/dQ, indicated the precipitation of lithium from the negative electrode surface. The results are shown in Table 4 below.

b) Evaluating Rapid Charging Performance

For the lithium secondary batteries prepared in Examples 3-4 and Comparative Examples 5-8, the charge capacity and charge rate were measured after 300 repetitions of the charge-discharge process of discharging at 0.5 C and charging at a 1.7 C charge rate. The ratio of the measured charge capacity to the initial charge capacity was calculated, and the results are shown in Table 4 below. The ratio of the calculated charge capacity to the initial charge capacity is marked with an "○" if it was greater than 80%, an "X" if it was less than or equal to 50%, and a "Δ" if it was greater than 50% but less than 80%.

TABLE 4

|  | Whether lithium precipitated | Rapid charging performance |
|---|---|---|
| Example 4 | X | ○ |
| Example 5 | X | ○ |
| Comparative Example 5 | ○ | Δ |
| Comparative Example 6 | X | Δ |
| Comparative Example 7 | X | X |
| Comparative Example 8 | X | X |

As shown in Table 4, it can be seen that the negative electrode for lithium secondary battery according to the present disclosure not only suppress lithium precipitation, but also have excellent rapid charging performance. Specifically, the negative electrodes prepared in the examples do not precipitate lithium from the negative electrode surface during charge and discharge, and the charge capacity is maintained by more than 80% during rapid charging.

This means that the negative electrodes of the examples contain a high loading amount of carbon-based negative electrode active material in the edge region of the negative electrode active layer, which has a good effect of suppressing lithium precipitation during charging of the battery; and that the alignment (O.I) of each carbon-based negative electrode active material contained in the center region, edge region, and sliding region of the negative electrode active layer has a configuration satisfying Equation 1 and Equation 2, which improves the rapid charging performance of the battery.

From these results, it can be seen that the negative electrode for a lithium secondary battery according to the present disclosure suppresses lithium precipitation at the end of the negative electrode active layer, and the secondary battery including the negative electrode has excellent rapid charging performance.

Although the above has been described with reference to a preferred exemplary embodiment of the present disclosure, it will be understood by those skilled in the art or having ordinary knowledge of the art that various modifications and changes can be made to the present disclosure without departing from the ideas and technical scope of the present disclosure described in the following claims.

Accordingly, the technical scope of the present disclosure is not limited to what is described in the detailed description of the specification, but should be defined by the patent claims.

REFERENCE NUMERALS

100 AND 200: NEGATIVE ELECTRODE FOR LITHIUM SECONDARY BATTERY

110 AND 210: NEGATIVE ELECTRODE CURRENT COLLECTOR

120 AND 220: NEGATIVE ELECTRODE ACTIVE LAYER

121 AND 221: CENTER REGION OF THE NEGATIVE ELECTRODE ACTIVE LAYER

122 AND 222: EDGE REGION OF THE NEGATIVE ELECTRODE ACTIVE LAYER

123 AND 223: SLIDING REGION OF THE NEGATIVE ELECTRODE ACTIVE LAYER

C-A: CARBON-BASED NEGATIVE ELECTRODE ACTIVE MATERIAL

↑: CRYSTAL FACE ALIGNMENT DIRECTION OF CARBON-BASED NEGATIVE ELECTRODE ACTIVE MATERIAL

The invention claimed is:

1. A negative electrode for a lithium secondary battery, comprising:

a negative electrode current collector; and a negative electrode active layer provided on at least one side of the negative electrode current collector and including a carbon-based negative electrode active material, wherein the negative electrode active layer is divided into a center region including a center part in a width direction of the negative electrode active layer, a sliding region located at an edge of the negative electrode active layer and having a thickness gradient, and an edge region located between the center region and the sliding region, wherein the center region has a ratio of 90% or more of a total length in the width direction of the negative electrode active layer, the sliding region has a ratio of 3% or less of the total length in the width direction of the negative electrode active layer, and the edge region has a ratio excluding the ratio of the center region and the sliding region among the total length in the width direction of the negative electrode active layer, wherein a loading amount per unit area of the carbon-based negative electrode active material contained in the edge region is greater than a loading amount per unit area of the carbon-based negative electrode active material contained in the center region, wherein the center region has an alignment of 0.7 to 1.5, and satisfies Equation 1 and Equation 2:

$$2.7 \leq [O.I_{edge}]/[O.I_{center}] \leq 4.8 \qquad \text{[Equation 1]}$$

$$1.5 \leq [O.I_{sliding}]/[O.I_{center}] \leq 2.6 \qquad \text{[Equation 2]}$$

wherein, in Equation 1 and Equation 2, $O.I_{edge}$ represents an alignment at the edge region, $O.I_{center}$ represents the alignment in the center region, $O.I_{sliding}$ represents an alignment in the sliding region, and wherein the alignment at the edge region, in the center region, and in the sliding region represents a ratio of an area of a peak representing a (0,0,4) crystal face to an area of a peak representing a (1,1,0) crystal face in an XRD measurement for the negative electrode active layer.

2. The negative electrode of claim 1, wherein the center region of the negative electrode active layer has an average thickness ranging from 100 μm to 300 μm.

3. The negative electrode of claim 1, wherein the carbon-based active material includes at least one of natural graphite or synthetic graphite.

4. The negative electrode of claim 1, wherein the sliding region has a thickness gradient that decreases away from the edge region.

\* \* \* \* \*